(12) United States Patent
Park

(10) Patent No.: US 11,904,684 B2
(45) Date of Patent: Feb. 20, 2024

(54) SYSTEM AND METHOD FOR CONTROLLING SWITCHING OF ELECTRIC VEHICLE TO FOUR-WHEEL DRIVE

(71) Applicants: HYUNDAI MOTOR COMPANY, Seoul (KR); KIA CORPORATION, Seoul (KR)

(72) Inventor: Se Hoon Park, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 419 days.

(21) Appl. No.: 17/459,700

(22) Filed: Aug. 27, 2021

(65) Prior Publication Data

US 2022/0250471 A1    Aug. 11, 2022

(30) Foreign Application Priority Data

Feb. 10, 2021    (KR) .................. 10-2021-0018786

(51) Int. Cl.
*B60K 23/08* (2006.01)
*B60L 15/20* (2006.01)
*B60K 17/356* (2006.01)
*B60K 1/02* (2006.01)

(52) U.S. Cl.
CPC ............ *B60K 23/0808* (2013.01); *B60K 1/02* (2013.01); *B60K 17/356* (2013.01); *B60L 15/20* (2013.01); *B60L 2240/423* (2013.01); *B60L 2240/80* (2013.01); *B60L 2250/26* (2013.01); *B60L 2260/28* (2013.01)

(58) Field of Classification Search
CPC .... B60K 23/0808; B60K 1/02; B60K 17/356; B60L 15/20; B60L 2240/423; B60L 2240/80; B60L 2250/26; B60L 2260/28
See application file for complete search history.

(56) References Cited

U.S. PATENT DOCUMENTS

| | | | |
|---|---|---|---|
| 2004/0147366 A1* | 7/2004 | Aoki ................. | B60K 6/52 477/6 |
| 2011/0172863 A1* | 7/2011 | Yu .................... | G16Z 99/00 180/65.285 |
| 2013/0046429 A1* | 2/2013 | Tashiro ............... | B60W 10/08 180/65.265 |
| 2017/0282752 A1* | 10/2017 | Konishi .............. | B60L 15/2054 |
| 2018/0126848 A1* | 5/2018 | Goossens ............ | F16D 48/06 |

(Continued)

*Primary Examiner* — Hunter B Lonsberry
*Assistant Examiner* — Harrison Heflin
(74) *Attorney, Agent, or Firm* — MORGAN, LEWIS & BOCKIUS LLP

(57) ABSTRACT

A system and method for controlling switching of an electric vehicle to four-wheel drive are provided. The system includes a first motor connected to main drive wheels and configured to output a first torque, a second motor connected to subsidiary drive wheels and configured to output a second torque, a disconnector mounted on an axle shaft for the subsidiary drive wheels, a driver requested torque detector configured to detect a driver requested torque, and a controller configured to release a set output limit of the first motor for a designated time and simultaneously release a set output limit of the second motor when the driver requested torque is greater than or equal to a reference requested torque, and control the first motor to output a maximum torque exceeding the set output limit to the main drive wheels until the disconnector is engaged.

10 Claims, 3 Drawing Sheets

(56) References Cited

U.S. PATENT DOCUMENTS

| | | | | |
|---|---|---|---|---|
| 2018/0134154 A1* | 5/2018 | Shimizu | ............... | B60K 23/08 |
| 2019/0039621 A1* | 2/2019 | Takahashi | ....... | B60W 30/18181 |
| 2020/0122730 A1* | 4/2020 | Shimizu | ............ | B60K 17/3515 |
| 2020/0223310 A1* | 7/2020 | Weidemann | ....... | B60K 23/0808 |
| 2021/0253088 A1* | 8/2021 | Oguro | ............... | B60W 40/068 |
| 2023/0365001 A1* | 11/2023 | Hiroi | ................ | B60L 15/2081 |

\* cited by examiner

SYSTEM AND METHOD FOR CONTROLLING SWITCHING OF ELECTRIC VEHICLE TO FOUR-WHEEL DRIVE

CROSS-REFERENCE TO RELATED APPLICATION

This application claims priority to and the benefit of Korean Patent Application No. 10-2021-0018786, filed on Feb. 10, 2021, the entire contents of which are incorporated herein by reference.

TECHNICAL FIELD

The present disclosure relates to a system and method for controlling switching of an electric vehicle to four-wheel drive.

BACKGROUND

The statements in this section merely provide background information related to the present disclosure and may not constitute prior art.

As is well known, electric motors are mounted as driving sources in hybrid electric vehicles, electric vehicles, hydrogen fuel cell vehicles, etc., and these vehicles are referred to as electrified vehicles.

Among such electrified vehicles, an electric vehicle may be mounted with a four-wheel drive powertrain configured such that motors as driving sources are connected, respectively, to front wheels and rear wheels.

The above information disclosed in this Background section is only for enhancement of understanding of the background of the disclosure and therefore it may contain information that does not form the prior art that is already known in this country to a person of ordinary skill in the art.

SUMMARY

The present disclosure provides a system and method for controlling switching of an electric vehicle to four-wheel drive which temporarily releases a set output limit of a first motor for main drive wheels and simultaneously releases a set output limit of a second motor for subsidiary drive wheels, when a driver requested torque is greater than or equal to a reference requested torque, and drives the main drive wheels at the maximum torque, before a disconnector is engaged in order to drive the subsidiary drive wheels, thereby being capable of increasing the speed of engagement of the disconnector and minimizing a sense of lag and a sense of inconsistency in acceleration when the disconnector is engaged.

In one aspect, the present disclosure provides a system for controlling switching of an electric vehicle to four-wheel drive, the system including a first motor connected to main drive wheels so as to output a torque thereto, a second motor connected to subsidiary drive wheels so as to output a torque thereto, a disconnector mounted on an axle shaft for the subsidiary drive wheels, a driver requested torque detector configured to detect a driver requested torque, and a controller configured to release a set output limit of the first motor for a designated time and to simultaneously release a set output limit of the second motor, when the driver requested torque is greater than or equal to a reference requested torque, and to control the first motor to output a maximum torque exceeding the set output limit thereof to the main drive wheels before the disconnector is engaged.

In one form of the present disclosure, the controller may be configured to increase a torque of the second motor to a designated level or higher at a predetermined slope, when the torque of the second motor is output to the subsidiary drive wheels, after the disconnector is engaged.

In another form of the present disclosure, the controller may determine that the driver requested torque is satisfied, when the torque of the second motor is increased to the designated level or higher.

In another form of the present disclosure, the controller may be configured to decrease a torque of the first motor output to the main drive wheels in inverse proportion to an increase in the torque of the second motor to the designated level or higher, after the controller determines that the driver requested torque is satisfied.

In some forms of the present disclosure, the controller may be configured to restore the set output limit of the first motor and to simultaneously restore the set output limit of the second motor, when the driver requested torque is less than the reference requested torque after the controller determines that the driver requested torque is satisfied.

In some forms of the present disclosure provides a method for controlling switching of an electric vehicle to four-wheel drive, the method including detecting, by a driver requested torque detector, a driver requested torque, releasing, by a controller, a set output limit of a first motor for a designated time and simultaneously releasing a set output limit of a second motor, when the driver requested torque is greater than or equal to a reference requested torque, and controlling, by the controller, the first motor to output a maximum torque exceeding the set output limit thereof, before a disconnector is engaged.

In some forms of the present disclosure, the method may further include increasing, by the controller, a torque of the second motor to a designated level or higher at a predetermined slope, when the torque of the second motor is output to the subsidiary drive wheels, after the disconnector is engaged, and the controller may determine that the driver requested torque is satisfied, when the torque of the second motor is increased to the designated level or higher.

In some forms of the present disclosure, the method may further include decreasing, by the controller, a torque of the first motor output to the main drive wheels in inverse proportion to an increase in the torque of the second motor to the designated level or higher, after the controller determines that the driver requested torque is satisfied.

In some forms of the present disclosure, the method may further include restoring, by the controller, the set output limit of the first motor and simultaneously restoring the set output limit of the second motor, when driver requested torque is less than the reference requested torque, after the controller determines that the driver requested torque is satisfied.

Other forms of the disclosure are discussed infra.

The above and other features of the present disclosure are discussed infra.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
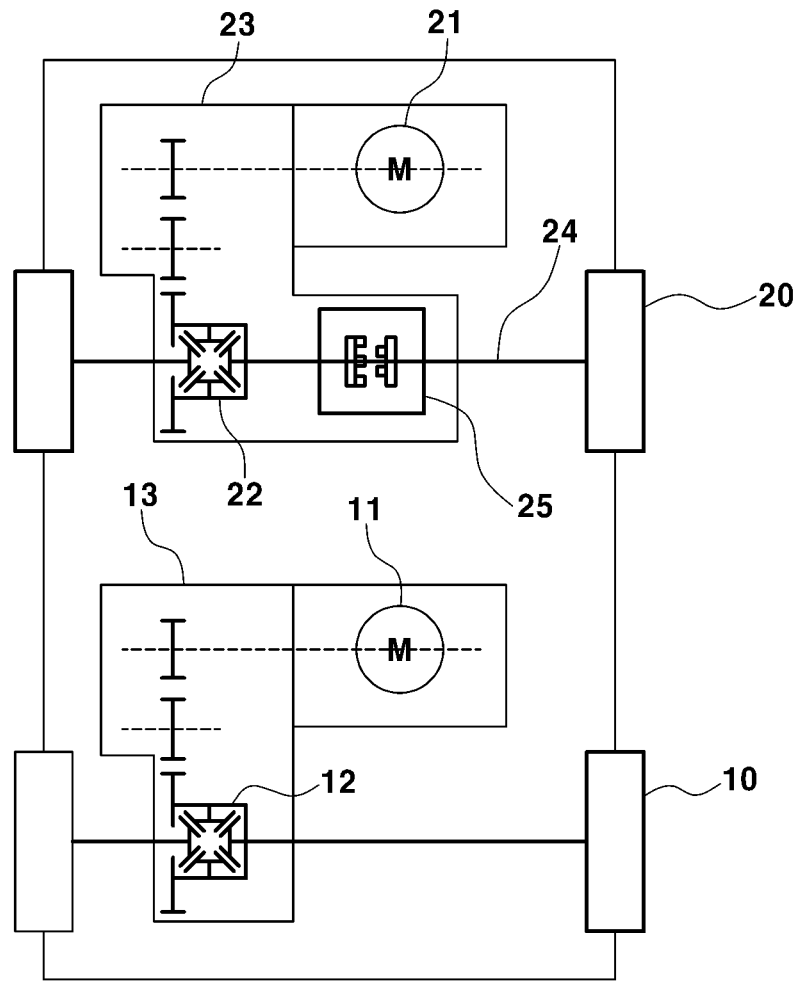
FIG. 1 is a schematic view illustrating one example of a four-wheel drive powertrain of an electric vehicle.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, reference will now be made in detail to various forms of the present disclosure, examples of which are illustrated in the accompanying drawings and described below. While the disclosure will be described in conjunction with exemplary forms, it will be understood that the present description is not intended to limit the disclosure to those exemplary forms. On the contrary, the disclosure is intended to cover not only the exemplary forms, but also various alternatives, modifications, equivalents and other forms, which may be included within the spirit and scope of the disclosure as defined by the appended claims.

The four-wheel drive powertrain of the electric vehicle may include, as shown in FIG. 1, a first motor 11 serving as a driving source of main drive wheels 10, a first reducer 13 disposed between the first motor 11 and a differential gear assembly in an axle housing 12 for the main drive wheels 10, a second motor 12 serving as a driving source of subsidiary drive wheels 20, a second reducer 23 disposed between the second motor 21 and a differential gear assembly in an axle housing 22 for the subsidiary drive wheels 20, and a disconnector 25 mounted on an axle shaft 24 for the subsidiary drive wheels 20.

Therefore, in the disengaged state of the disconnector 25, the electric vehicle drives in a two-wheel drive state in which only the power of the first motor 11 is transmitted to the main drive wheels 10 via the first reducer 13, and on the other hand, when the disconnector 25 is engaged, the electric vehicle is switched to a four-wheel drive state in which the power of the first motor 11 is transmitted to the main drive wheels 10, and simultaneously, the power of the second motor 21 is transmitted to the subsidiary drive wheels 20 via the second reducer 23.

Here, in order to switch the disconnector 25 from the disengaged state to the engaged state, synchronization of the speeds of both subsidiary drive wheels, which are non-drive wheels, is required.

That is, it is necessary to engage the disconnector 25 in order to transmit the power of the second motor 21 to the subsidiary drive wheels, and for this purpose, synchronization of the speeds of both subsidiary drive wheels, i.e., the non-drive wheels, is required.

However, because the disconnector 25 has the same operating structure as that of a dog clutch, it takes a long time (for example, 400-500 ms) to completely engage the disconnector 25 as a result of addition of the time taken to operate to engage the disconnector 25 to the time (for example, 250 ms) taken to synchronize the speeds of the two subsidiary drive wheels, and particularly, as a vehicle speed increases, the value of ΔRPM for synchronization increases, and thus the time taken to synchronize the speeds of the two subsidiary drive wheels and to operate to engage the disconnector 25 may increase.

Consequently, the increased time taken to synchronize the speeds of the two subsidiary drive wheels and to operate to engage the disconnector 25 may cause a sense of lag and a sense of inconsistency in acceleration of the electric vehicle.

As described above with reference to FIG. 1, the four-wheel drive powertrain of the electric vehicle may include the first motor 11 serving as the driving source of the main drive wheels 10, the first reducer 13 disposed between the first motor 11 and the differential gear assembly in the axle housing 12 for the main drive wheels 10, the second motor 21 serving as the driving source of the subsidiary drive wheels 20, the second reducer 23 disposed between the second motor 21 and the differential gear assembly in the axle housing 22 for the subsidiary drive wheels 20, and the disconnector 25 mounted on the axle shaft 24 for the subsidiary drive wheels 20.

In the disengaged state of the disconnector 25, the electric vehicle drives in the two-wheel drive state, in which only the power of the first motor 11 is transmitted to the main drive wheels 10 via the first reducer 13, and on the other hand, when the disconnector 25 is engaged, the electric vehicle is switched to the four-wheel drive state in which the power of the first motor 11 is transmitted to the main drive wheels 10 and simultaneously the power of the second motor 21 is transmitted to the subsidiary drive wheels 20 via the second reducer 23.

Here, in order to switch the disconnector 25 from the disengaged state to the engaged state so as to drive the electric vehicle in the four-wheel drive state, rapid synchronization of the speeds of both subsidiary drive wheels, which are the non-drive wheels, is required, and because the power of the second motor 21 is not transmitted to the subsidiary drive wheels 20 before the disconnector 25 is engaged, a sense of acceleration needs to be supplemented so as to satisfy a driver requested torque.

For this purpose, the present disclosure provides a system and method for controlling switching of an electric vehicle to four-wheel drive which temporarily releases a set output limit of a first motor for main drive wheels and simultaneously releases a set output limit of a second motor for subsidiary drive wheels when a driver requested torque is greater than or equal to a reference requested torque required for four-wheel drive of the electric vehicle, and drives the main drive wheels at the maximum torque before a disconnector is engaged in order to drive the subsidiary drive wheels, thereby being capable of increasing the speed of engagement of the disconnector and minimizing a sense of lag and a sense of inconsistency in acceleration when the disconnector is engaged.

Figure 2:
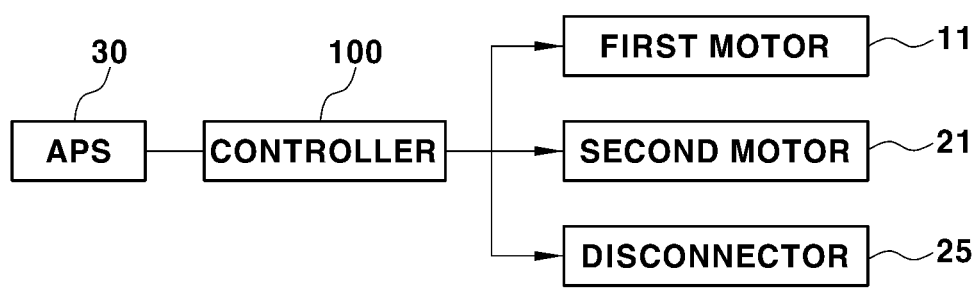
FIG. 2 is a block diagram illustrating a system for controlling switching of an electric vehicle to four-wheel drive in some forms of the present disclosure.
Figure 3:
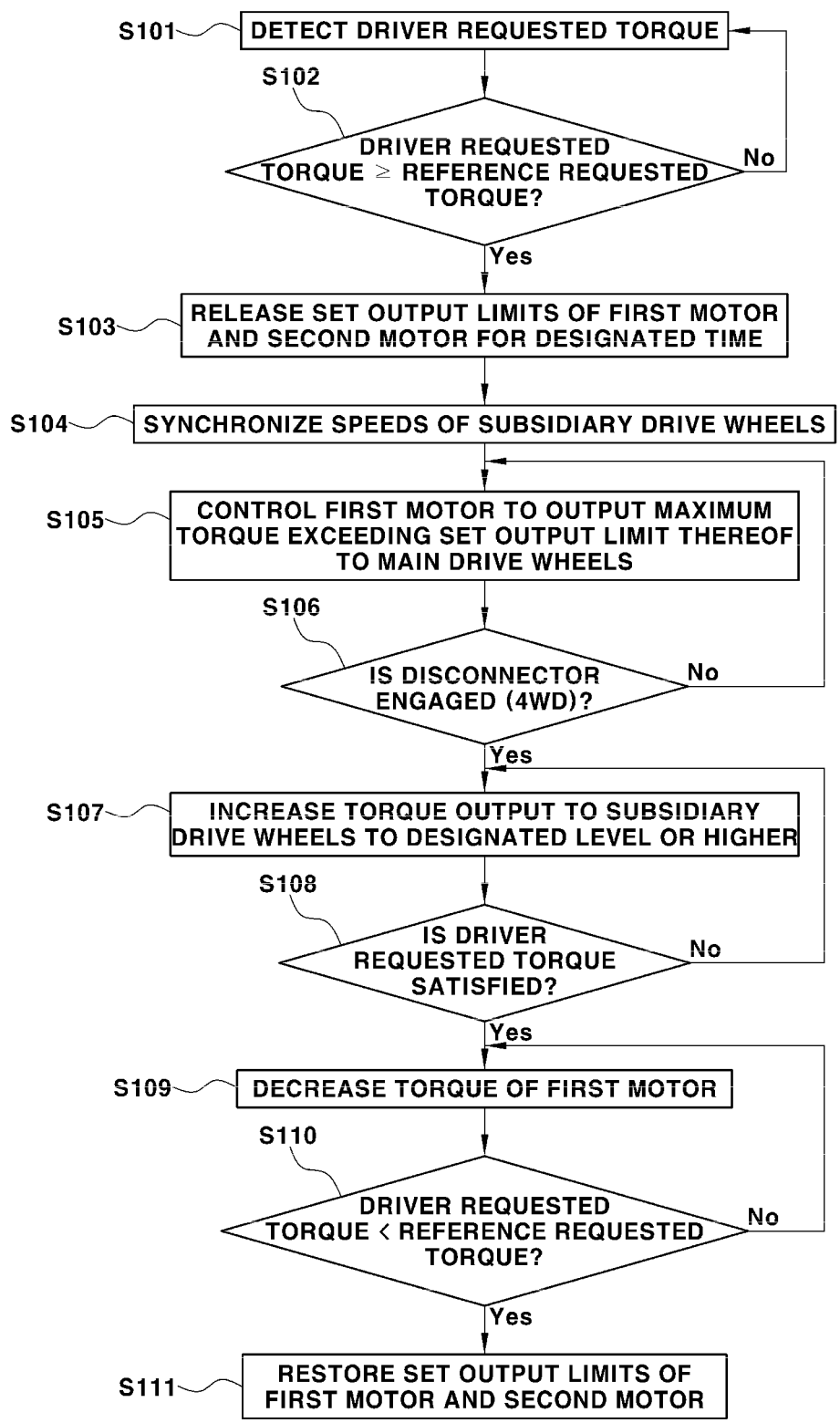
FIG. 3 is a flowchart showing a method for controlling switching of an electric vehicle to four-wheel drive in some forms of the present disclosure.
Figure 4:
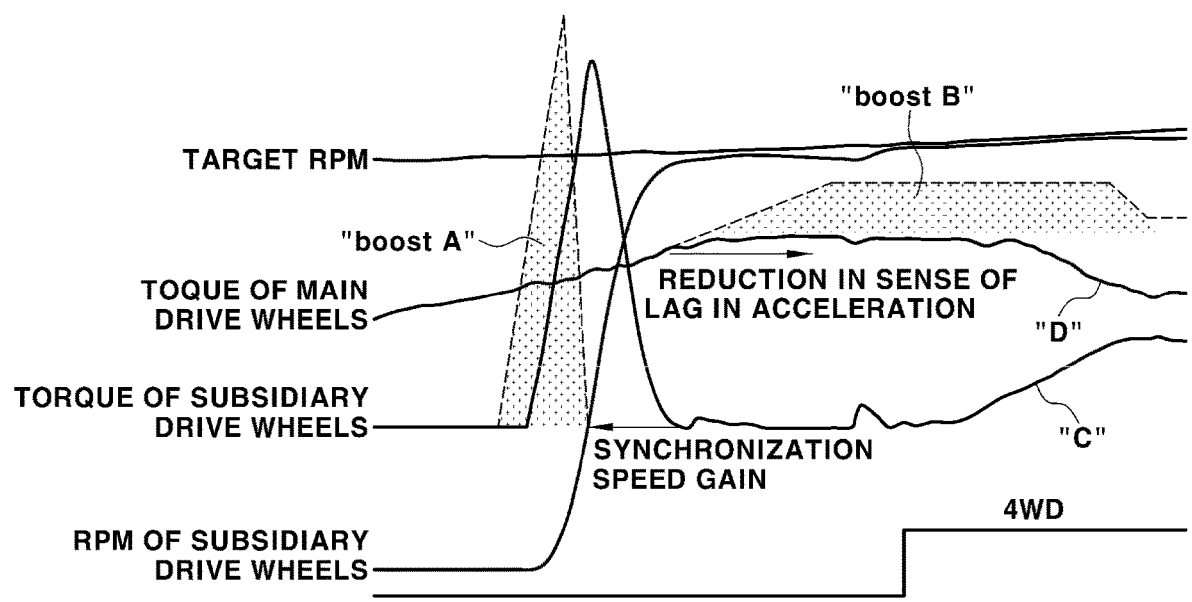
FIG. 4 is a torque-speed graph showing switching of the electric vehicle to four-wheel drive in some forms of the present disclosure.

FIG. 2 is a block diagram illustrating a system for controlling switching of an electric vehicle to four-wheel drive in some forms of the present disclosure, FIG. 3 is a flowchart showing a method for controlling switching of an electric vehicle to four-wheel drive in some forms of the present disclosure, and FIG. 4 is a torque-speed graph showing switching of the electric vehicle to four-wheel drive in some forms of the present disclosure.

As shown in FIG. 2, a system for controlling switching of an electric vehicle to four-wheel drive in some forms of the present disclosure includes a motor 11 connected to main drive wheels so as to output a torque thereto, a second motor 21 connected to subsidiary drive wheels so as to output a torque thereto, a disconnector 25 mounted on an axle shaft for the subsidiary drive wheels, a driver requested torque detector 30 configured to detect a driver requested torque, and a controller 100 configured to control release and restoration of set output limits of the first motor 11 and the second motor 21, to control a torque, and to control engagement of the disconnector 25.

The driver requested torque detector 30 may employ an accelerator position sensor (APS).

The controller 100 may include a vehicle control unit, which is the uppermost-level control unit, and a motor control unit configured to control the motors 11 and 12 based on a command from the vehicle control unit, or may be a single integrated control unit.

Particularly, when the driver requested torque provided by the driver requested torque detector 30 is greater than or equal to a reference requested torque required for four-wheel drive of the electric vehicle, the controller 100 releases the set output limit of the first motor 11 for a designated time and simultaneously releases the set output limit of the second motor 21, and performs torque control so that the first motor 11 outputs the maximum torque exceeding the set output limit thereof to the main drive wheels before the disconnector 25 is engaged.

Further, when a torque resulting from driving of the second motor 21 is output to the subsidiary drive wheels after the disconnector 25 is engaged, the controller 100 increases the torque of the second motor 21 to a designated level or higher at a predetermined slope, and determines that the driver requested torque is satisfied when the torque of the second motor 21 is increased to the designated level or higher.

That is, the first motor 11 may output the maximum torque exceeding the set output limit thereof to the main drive wheels before the disconnector 25 is engaged, and the torque resulting from driving of the second motor 21 may be increased to the designated level or higher and be output to the subsidiary driving wheels after the disconnector 25 is engaged, and thus, it may be determined that the driver requested torque is satisfied.

Further, after it is determined that the driver requested torque is satisfied, the controller 100 may decrease the torque of the first motor 11 output to the main drive wheels in inverse proportion to the increase in the output torque of the second motor 21 to the designated level or higher. The reason for this is that because torque supplementation in which the output torque of the second motor 21 is increased to the designated level or higher is realized, the first motor 11 does not need to output the maximum torque exceeding the set output limit thereof to the main drive wheels any more.

Further, after it is determined that the driver requested torque is satisfied, the controller 100 restores the set output limit of the first motor 11 and simultaneously restores the set output limit of the second motor 21, when the driver's request torque is less than the reference torque or the set output limits of the first and second motors 11 and 21.

Hereinafter, a method for controlling switching of the electric vehicle to four-wheel drive in some forms of the present disclosure will be described in more detail with reference to FIGS. 3 and 4.

Powers output by power electronics (PE) parts, such as motors, inverters, etc., which are mounted in electric vehicles, are limited in order to maintain the durability thereof, and a mode in which such power limits are released so that the powers, the limits of which are released, are used for a short time is referred to as a boost mode.

Thus, the present disclosure is characterized in that the powers of the motors 11 and 21, the limits of which are released, (the powers of the motors exceeding the respective set output limits) are used for a short time so as to synchronize the speeds of both subsidiary drive wheels for connecting the disconnector 25, and the main drive wheels are controlled to supplement a shortage in the driver requested torque before the disconnector 25 is engaged, thereby being capable of minimizing the engagement time of the disconnector and simultaneously minimizing a sense of lag and a sense of inconsistency in acceleration.

First, the driver requested torque detector 30 detects a driver requested torque and provides the detected driver requested torque to the controller 100 (S101).

For example, when a driver steps on an accelerator pedal, the APS, serving as the driver requested torque detector 30, may detect the extent (%) of depression of the accelerator pedal and provide the detected extent of depression of the accelerator pedal to the controller 100, and the controller 100 may determine the magnitude of the driver requested torque based on the extent of depression of the accelerator pedal.

Thereafter, the controller 100 determines whether or not the driver requested torque is greater than or equal to the reference requested torque by comparing the driver requested torque with the reference requested torque (S102).

As a result of the comparison, upon determining that the driver requested torque is greater than or equal to the reference requested torque required for four-wheel drive, the controller 100 releases the set output limit of the first motor 11 for a designated time and simultaneously releases the set output limit of the second motor 21 (S103).

Because the set output limits of the first and second motors 11 and 21 are released, the first and second motors 11 and 21 are in a state in which the torque outputs of the first and second motors 11 and 21 are capable of being temporarily boosted, and thus, the powers of the respective motors 11 and 21, the limits of which are released, (for example, the power of the motors 11 and 21 exceeding the set output limits) are capable of being used.

In more detail, a driver requested torque that is greater than or equal to the reference requested torque means that rapid responsiveness to acceleration is required, and for this purpose, the set output limit of the first motor 11 may be temporarily released, and simultaneously, the set output limit of the second motor 21 may be released so that the torque outputs of the first and second motors 11 and 21 are capable of being temporarily boosted and in this case, the set output limits of the respective motors 11 and 21 may be released under conditions not to hinder a fail-safe, for example, as long as overheating of PE parts and the SOC of a battery are satisfied.

Thereafter, the torque of the second motor 21 is boosted due to the release of the set output limit of the second motor 21, and thus, the speeds (RPMs) of the subsidiary drive wheels 20 are synchronized (S104).

In more detail, when the torque of the second motor 21 is boosted due to the release of the set output limit of the second motor 21 and is output to the axle shaft 24 for the subsidiary drive wheels and the disconnector 25, the torque output to the subsidiary drive wheels may be rapidly boosted to be increased, as indicated by "boost A" of FIG. 4, and the speeds (RPMs) of the subsidiary drive wheels may rapidly reach a target speed (RPM) for synchronization.

By using a greater torque than usual in the control of synchronization of the speeds of the subsidiary drive wheels for engaging the disconnector 25, a reduction in the speed synchronization time by about 50-100 ms may be expected.

Here, a sense of lag and a sense of inconsistency in acceleration may be caused because the power of the second motor 21 is not transmitted to the subsidiary drive wheels 20 before the disconnector 25 is engaged after the speed synchronization of the subsidiary drive wheels, and thus, in order to solve such problems, a sense of acceleration should be supplemented.

Therefore, the first motor 11 outputs the maximum torque exceeding the set output limit thereof to the main drive wheels before the disconnector 25 is engaged (S105).

In more detail, the controller 100 may perform torque control in which the first motor 11 outputs the maximum torque exceeding the set output limit thereof to the main drive wheels before the disconnector 25 is engaged, and may thus realize supplementation of the sense of acceleration so as to supplement a shortage in the torque output to the subsidiary drive wheels due to the boost effect in which the torque output to the main drive wheels is increased before the disconnector 25 is engaged, as indicated by "boost B" of FIG. 4, thereby minimizing the sense of lag and the sense of difference in acceleration.

Thereafter, the controller 100 confirms whether or not the disconnector 25 is engaged so as to switch the electric vehicle to the four-wheel drive state (S106).

In more detail, the controller 100 may operate an actuator included in the disconnector 25 so as to engage the disconnector 25 after the speed synchronization of the subsidiary drive wheels, and may recognize whether or not the disconnector 25 is engaged.

Therefore, when the disconnector 25 is engaged and thus the electric vehicle switches to the four-wheel drive state, a torque resulting from driving of the second motor 21 may be output to the subsidiary drive wheels.

Thereafter, the controller 100 increases the torque of the second motor 21 to a designated level or higher (S107).

In more detail, when the disconnector 25 is engaged and thus the electric vehicle is in the state in which the torque resulting from driving of the second motor 21 is capable of being output to the subsidiary drive wheels, the controller 100 performs torque control in which the torque of the second motor 21 is increased to the designated level or higher at a predetermined slope, and thus, the torque output to the subsidiary drive wheels may be increased to the designated level or higher.

Subsequently, the controller 100 confirms whether or not the driver requested torque is satisfied (S108).

After the disconnector 25 is engaged and thus the electric vehicle switches to the four-wheel drive state, when the torque of the second motor 21 is increased to the designated level or higher at the predetermined slope, the controller 100 determines that the driver requested torque is satisfied.

Here, when the torque of the second motor 21 is increased to the designated level or higher at the predetermined slope and thus the controller 100 determines that the driver requested torque is satisfied, the first motor 11 does not need to output the maximum torque exceeding the set output limit thereof to the main drive wheels any more.

Therefore, the controller 100 decreases the torque of the first motor 11 which is output to the main drive wheels, i.e., the torque output to the main drive wheels, in inverse proportion to the increase in the torque of the second motor 21 to the designated level or higher, as indicated by "D" of FIG. 4 (S109).

Thereafter, after the controller 100 determines that the driver requested torque is satisfied, the controller 100 determines whether or not the driver requested torque is less than the reference requested torque by comparing the driver requested torque with the reference requested torque again (S110).

As a result of the comparison, upon determining that the driver requested torque is less than the reference requested torque, there is no need to release the set output limits of the first motor 11 and the second motor 21 any more, and thus, the controller 100 restores the set output limit of the first motor 11 and simultaneously restores the set output limit of the second motor 21 (S111).

As is apparent from the above description, a system and method for controlling switching of an electric vehicle to four-wheel drive according to the present disclosure may provide the following effects.

First, when a driver requested torque is greater than or equal to a reference requested torque required for four wheel drive of the electric vehicle, the electric vehicle is in a state in which the torque output of a second motor is capable of being boosted by temporarily releasing the set output limit of the second motor for subsidiary drive wheels, thereby allowing the speeds (RPMs) of the subsidiary drive wheels to rapidly reach a target speed (RPM) for synchronization, reducing the time taken to synchronize the speeds of the subsidiary drive wheels and thus being capable of increasing the speed of engagement of a disconnector.

Second, when the driver requested torque is greater than or equal to the reference requested torque required for four-wheel drive of the electric vehicle, the electric vehicle is in a state in which the torque output of a first motor is capable of being boosted by temporarily releasing the set output limit of the first motor for main drive wheels, thereby driving the main drive wheels at the maximum torque before engaging the disconnector for driving the subsidiary drive wheels and thus being capable of minimizing a sense of lag and a sense of inconsistency in acceleration.

The disclosure has been described in detail with reference to preferred forms thereof. However, it will be appreciated by those skilled in the art that changes may be made in these forms without departing from the principles and spirit of the disclosure, the scope of which is defined in the appended claims and their equivalents.

What is claimed is:

1. A system for controlling switching of an electric vehicle to four-wheel drive comprising:
 a first motor connected to main drive wheels and configured to output a first torque;
 a second motor connected to subsidiary drive wheels and configured to output a second torque;

a disconnector mounted on an axle shaft for the subsidiary drive wheels;

a driver requested torque detector configured to detect a driver requested torque; and a controller configured to:

release a set output limit of the first motor for a designated time and simultaneously release a set output limit of the second motor when the driver requested torque is greater than or equal to a reference requested torque; and control the first motor to output a maximum torque exceeding the set output limit to the main drive wheels until the disconnector is engaged.

2. The system of claim 1, wherein the controller is configured to:

increase a torque of the second motor to greater than or equal to a designated level at a predetermined slope while the torque of the second motor is output to the subsidiary drive wheels when the disconnector is engaged.

3. The system of claim 2, wherein the controller is configured to:

determine that the driver requested torque is satisfied when the torque of the second motor is increased to greater than or equal to the designated level.

4. The system of claim 3, wherein the controller is configured to:

decrease a torque of the first motor output to the main drive wheels in inverse proportion to an increase in the torque of the second motor to greater than or equal to the designated level after it is determined that the driver requested torque is satisfied.

5. The system of claim 3, wherein the controller is configured to:

restore the set output limit of the first motor and simultaneously restore the set output limit of the second motor when the driver requested torque is less than the reference requested torque after it is determined that the driver requested torque is satisfied.

6. A method for controlling switching of an electric vehicle to four-wheel drive comprising:

detecting, by a driver requested torque detector, a driver requested torque;

when the driver requested torque is greater than or equal to a reference requested torque, releasing, by a controller, a set output limit of a first motor for a designated time and simultaneously releasing a set output limit of a second motor; and controlling, by the controller, the first motor to output a maximum torque exceeding the set output limit until a disconnector is engaged.

7. The method of claim 6, further comprising:

increasing, by the controller, a torque of the second motor to greater than or equal to a designated level at a predetermined slope while the torque of the second motor is output to the subsidiary drive wheels when the disconnector is engaged.

8. The method of claim 7, further comprising:

when the torque of the second motor is increased to greater than or equal to the designated level, determining, by the controller, that the driver requested torque is satisfied.

9. The method of claim 8, further comprising:

decreasing, by the controller, a torque of the first motor output to the main drive wheels in inverse proportion to an increase in the torque of the second motor to greater than or equal to the designated level after it is determined that the driver requested torque is satisfied.

10. The method of claim 8, further comprising:

when driver requested torque is less than the reference requested torque, restoring, by the controller, the set output limit of the first motor and simultaneously restoring the set output limit of the second motor, after it is determined that the driver requested torque is satisfied.

* * * * *